United States Patent
Veikkolainen et al.

(10) Patent No.: US 11,692,943 B2
(45) Date of Patent: Jul. 4, 2023

(54) MEASUREMENT APPARATUS AND MEASUREMENT METHOD

(71) Applicant: VALMET AUTOMATION OY, Espoo (FI)

(72) Inventors: Kari Veikkolainen, Espoo (FI); Marko Toskala, Espoo (FI); Markku Mäntylä, Espoo (FI)

(73) Assignee: VALMET AUTOMATION OY, Espoo (FI)

(*) Notice: Subject to any disclaimer, the term of this patent is extended or adjusted under 35 U.S.C. 154(b) by 0 days.

(21) Appl. No.: 17/707,532

(22) Filed: Mar. 29, 2022

(65) Prior Publication Data
US 2022/0317051 A1  Oct. 6, 2022

(30) Foreign Application Priority Data
Mar. 31, 2021 (FI) .................................. 20215384

(51) Int. Cl.
*G01N 21/86* (2006.01)
*G01N 21/31* (2006.01)
(Continued)

(52) U.S. Cl.
CPC ............ *G01N 21/86* (2013.01); *G01N 21/31* (2013.01); *G01N 21/59* (2013.01); *G01N 23/083* (2013.01);
(Continued)

(58) Field of Classification Search
CPC ... G01N 2021/8681; G01N 2021/8672; G01N 21/86; G01N 23/083; G01N 23/16; G01N 2021/8663
See application file for complete search history.

(56) References Cited

U.S. PATENT DOCUMENTS

| | | |
|---|---|---|
| 4,577,104 A | 3/1986 | Sturm |
| 4,845,730 A | 7/1989 | Mercer |

(Continued)

FOREIGN PATENT DOCUMENTS

| | | | | |
|---|---|---|---|---|
| CN | 102338744 A | * | 2/2012 | ......... G01B 11/0691 |
| EP | 2169390 A1 | * | 3/2010 | ............. G01N 23/16 |
| WO | WO-2008110667 A1 | * | 9/2008 | ........... D21G 9/0036 |

OTHER PUBLICATIONS

Oct. 25, 2021 Office Action issued in Finnish Patent Application No. 20215384.

(Continued)

*Primary Examiner* — Maurice C Smith
(74) *Attorney, Agent, or Firm* — Oliff PLC

(57) ABSTRACT

Measurement apparatus including an optical sensor, which performs repeatedly transmission measurements through moving sheet of paper or board at at least one wavelength band dominantly absorbed by water, at at least one wavelength band dominantly absorbed by cellulose. The apparatus also includes an X-ray sensor, which performs repeatedly transmission measurements through the moving sheet of paper or board with photons of electromagnetic radiation (1 keV to 10 keV). The apparatus comprises a data processing unit, which receives signals with information on intensities of the optical and X-ray radiations passed through the sheet from the optical sensor and the X-ray sensor, and determines, based on the information, all of the following of the moving sheet: the dry stuff content as a function of the cellulose mass per unit area of the sheet, water mass per unit area of the sheet and the ash mass per unit area of the sheet.

8 Claims, 3 Drawing Sheets

(51) Int. Cl.
*G01N 21/59* (2006.01)
*G01N 23/083* (2018.01)
*G01N 23/16* (2018.01)

(52) U.S. Cl.
CPC ..... *G01N 23/16* (2013.01); *G01N 2021/8663* (2013.01)

(56) References Cited

U.S. PATENT DOCUMENTS

| | | | |
|---|---|---|---|
| 5,099,118 A | 3/1992 | Francis | |
| 7,291,856 B2* | 11/2007 | Haran | G01N 21/8901 250/227.16 |
| 2007/0147584 A1* | 6/2007 | Hofman | G01N 23/083 378/53 |
| 2011/0204232 A1 | 8/2011 | Mantyla | |
| 2019/0302090 A1 | 10/2019 | Chen et al. | |

OTHER PUBLICATIONS

Jan. 4, 2023 Office Action issued in Finnish Patent Application No. 20215384.

* cited by examiner

MEASUREMENT APPARATUS AND MEASUREMENT METHOD

FIELD

The invention relates to a measurement apparatus and a measurement method.

BACKGROUND

Measurements of basis weight BW, mass of water per unit area i.e. water weight WW and dry stuff content OD (oven dry) are important during the manufacturing of paper or board. However, ash content of the sheet disturbs the measurements of the dry stuff content. Recycling increases uncertainty of ash content of a machine stock because ash content of partial stocks fed to a paper or board machine is not known. That leads to unreliable measurement results and potential variation of the end product. Control of the production line also becomes challenging when measurements cannot fully be trusted. Additionally, a β-radiation measurement that could provide reliable information on the ash content of the web cannot easily be utilized because of its radioactivity and consequential dangers to people and the environment.

Hence, an improvement would be welcome.

BRIEF DESCRIPTION

The present invention seeks to provide an improvement in the measurements and control.

The invention is defined by the independent claims. Embodiments are defined in the dependent claims.

LIST OF DRAWINGS

Example embodiments of the present invention are described below, by way of example only, with reference to the accompanying drawings, in which FIG. 1 illustrates an example of a paper machine, FIG. 2 illustrates an example of optical and X-ray sensors;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features/structures that have not been specifically mentioned. All combinations of the embodiments are considered possible if their combination does not lead to structural or logical contradiction.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are Irrelevant to the actual invention. Therefore, they need not be discussed in more detail here.

Figure 1:
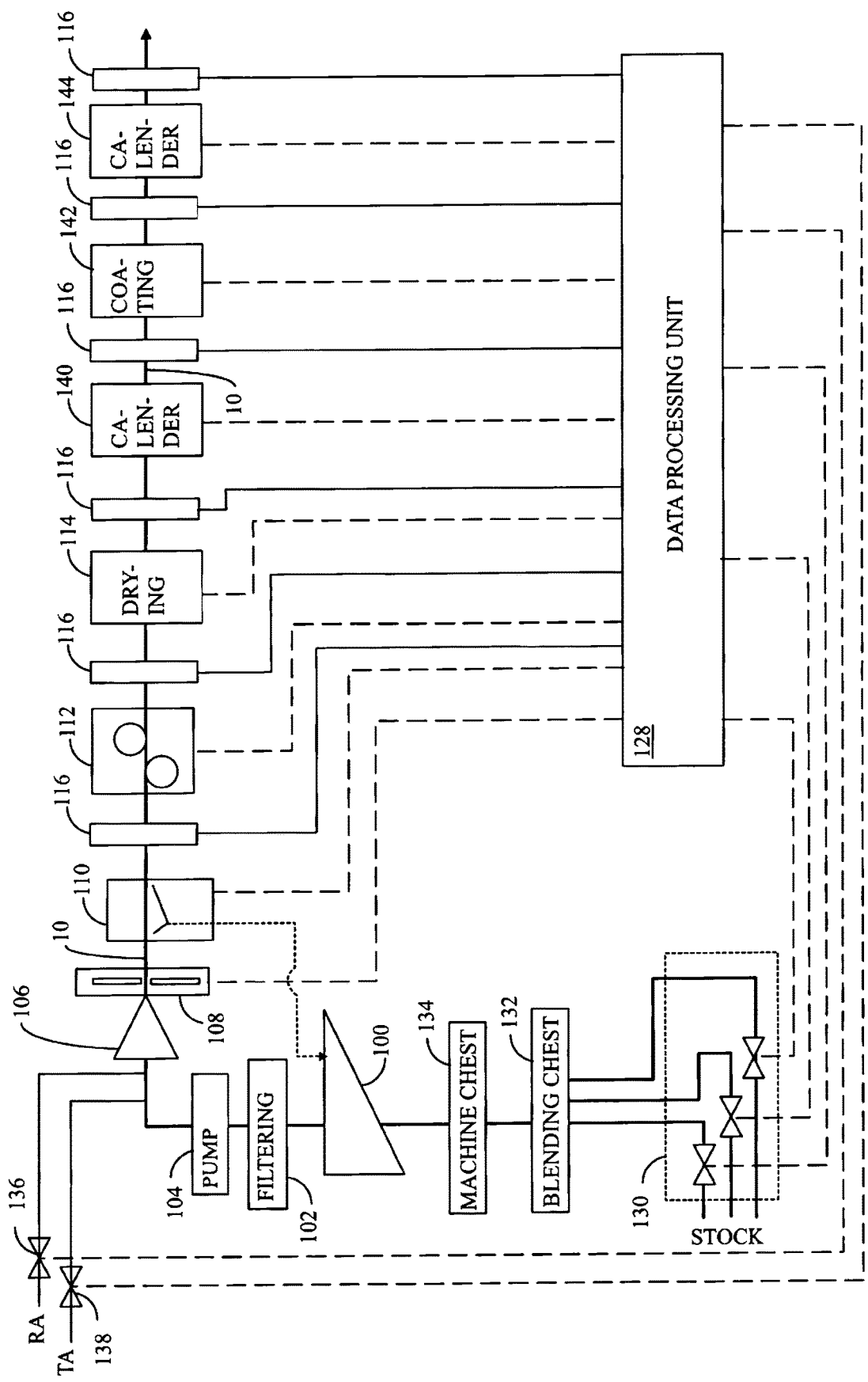

FIG. 1 shows an example of a paper machine that can be examined first. One or more stocks, which may include ash, cellulose and/or moisture, are fed onto a paper machine through a wire pit silo 100, which is usually preceded by a blending chest 132 for partial stocks and a machine chest 134. The machine stock is dispensed for a short circulation, for instance, controlled by a basis weight control or a grade change program. The blending chest 132 and the machine chest 134 may also be replaced by a separate mixing reactor (not shown in FIG. 1), and the dispensing of the machine stock is controlled by feeding each partial stock separately by means of valves or another flow control means 130. In the wire pit silo 100, water is mixed into the machine stock to obtain a desired consistency for the short circulation (dashed line from a former 110 to the wire pit silo 100).

From the obtained stock it is possible to remove sand or the like (centrifugal cleaners), air (deculator) and other coarse material (pressure filter) using cleaning devices 102, and the stock is pumped with a pump 104 to a headbox 106. The sand or the like that avoids removal may form a part of ash in paper or board. Before the headbox 106, it is possible to add to the stock, in a desired manner, a filler TA, including e.g. gypsum, kaolin, calcium carbonate, talcum, chalk, titanium dioxide and diatomite etc. and/or a retention agent RA, such as inorganic, inartificial organic or synthetic water-soluble organic polymers. The filler TA and/or the retention agent RA may include ash component of the paper or board.

Ash is what remains of paper or board after combustion at 900° C. according to TAPPI T 413 "Ash in Wood, Pulp, Paper and Paperboard: Combustion at 900° C.". According to TAPPI T 211 om-02, igniting papers or pulp containing no added fillers or coatings at either 525° C. or 900° C. will yield essentially identical results of a few tenths percent ash or less.

According to the standard (TAPPI T 211 om-02), the ash may include various residues from chemicals used in paper or board manufacture, metallic matter from piping and machinery, mineral matter in the pulp from which the paper was made, and/or filling, coating, pigmenting and/or other added materials. In general, ash is material of paper or board that does not combust.

From the headbox 106 the stock is fed through a slice opening 108 of the headbox to a former 110, which may be a fourdrinier wire or a gap former. In the former 110, water drains out of the web 10 and additionally ash, fines and fibres are led to the short circulation. In the former 110, the stock is fed as a web 10 onto a wire, and the web 10 is preliminary dried and pressed in a press 112. The web 10 is actually dried in driers 114. In general, there is at least one pair of sensors 116 that performs an optical measurement and an X-ray measurement for determining basis weight and/or dry stuff content of the web 10. The at least one pair of sensors 116 feeds the measured data to a data processing unit 128 (see continuous lines therebetween). The basis weight may be considered the same as the dry stuff content if water weight is not taken into account.

The paper or board machine may also include a pre-calender 140, a coating section 142 and/or a finishing calender 144. It is not necessary to have the coating section 142, however, and therefore it is not necessary to have more calenders 140, 144 than one. In the coating section 142, coating paste, which may include ash, may be spread onto paper. The coating paste may include gypsum, kaolin, talcum or carbonate, starch, latex or the like, for example.

In calenders 140, 144, where the uncoated or coated paper or board web runs between the rolls pressing with desired force, it is possible to change the surface properties of the paper, such as smoothness, roughness, topography, gloss and the like. The calender 140, 144 may also affect the paper thickness and/or the basis weight or other mass per unit area of the paper or board, for example. In the calender 140, 144, the properties of the paper web may be changed by means of web moistening, temperature and nip pressure between the rolls. In addition to this, it is clear that the operation of a paper machine is known per se to a person skilled in the art, and therefore, it need not be presented in greater detail in this context.

FIG. 1 also shows a control arrangement of the paper machine. Then the data processing unit 128 may also perform the data processing for the control of the paper or board machine. Factors affecting the quality and grade change include, inter alia, the number and mutual proportion of partial stocks, the amount of filler, the amount of retention agent, machine speed, the amount of white water and drying capacity. The data processing unit 128 may control the dispensing of partial stocks by means of valves 130, the dispensing of each filler TA by means of the valve 138, the dispensing of the retention agent RA by means of the valve 136, adjust the size of the slice opening 108, control the machine speed, control the amount of white water and the drying process in block 114 (see dashed lines). The data processing unit 128 utilizes the pair of the sensors 116 for measuring the web 10. The data processing unit 128 may also measure the properties of the web 10 elsewhere (e.g. at the same locations where controls are performed).

The data processing unit 128 may be conceived as a paper machine's control arrangement, or part thereof, based on automatic data processing. The data processing unit 128 may receive digital signals or convert the received analog signals to digital ones. The data processing unit 128 may comprise at least one processor and at least one memory and execute the signal processing in accordance with an appropriate computer program. The operating principle of the data processing unit 128 may be, for instance, PID (Proportional-Integral-Derivative), MPC (Model Predictive Control) or GPC (General Predictive Control) control.

Figure 2:
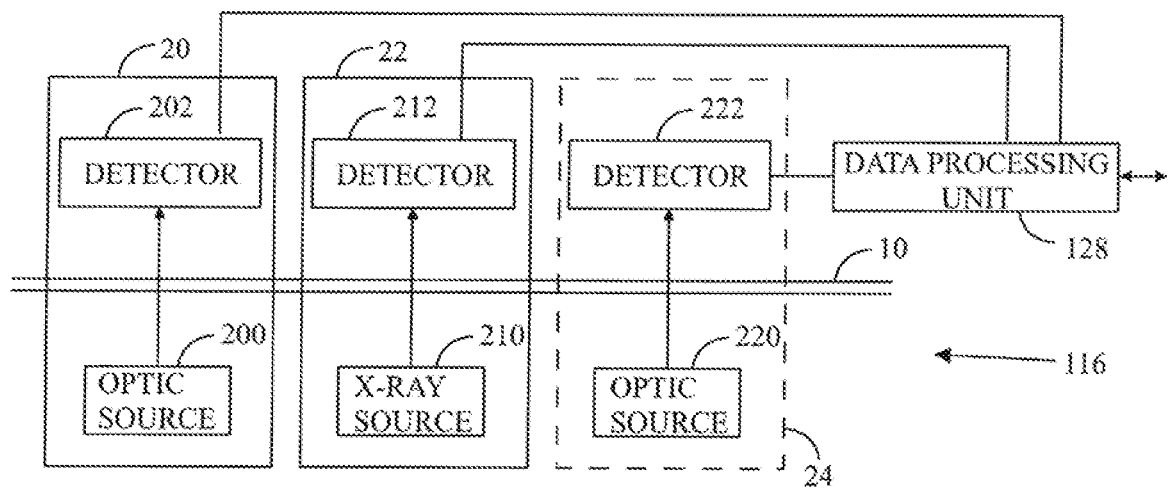

FIG. 2 illustrates an example of the least one pair of sensors 116. The least one pair of sensors 116 comprise an optical sensor 20 with an optical source 200 that outputs optical radiation at least in infrared region and an optical detector 202, and an X-ray sensor 22 with an X-ray source 210 and an X-ray detector 212.

The optical radiation may include infrared radiation in a NIR (Near infraRed) region having a wavelength range required to achieve the measurement results. The wavelength range may cover about 750 nm to about 2500 nm in a continuous or discrete manner. The optical source 200 may direct the optical radiation to the web 10, and the optical radiation propagates through the web 10 to an optical detector 202.

In an embodiment, the optical source 200 may output the narrow bands that are detected by the detector 202. The optical source 200 may then comprise one or more leds (Light Emitting Diode), lasers or the like. Leds and lasers may output narrowband optical radiation at desired wavelengths.

In an embodiment, the optical source 200 may output broadband optical radiation which includes measurement bands. The optical source 200 may then comprise one or more incandescent lamps, gas-discharge lamps or the like. The incandescent lamps and gas-discharge lamps output broadband optical radiation that include more than one of the measured optical wavelengths.

Narrow bands may be formed although the optical source 200 is a broadband source. Namely, between the optical source 200 of broadband radiation and the optical detector 202 there may be one or more filters that band pass the measurement wavelength bands for the detector 202 while fully or partly blocking other wavelengths. The filters may be attached with the optical source 200 and/or the optical detector 202. Alternatively, the filters may be separate from the optical source 200 and the optical detector 202.

The optical detector 202 detects the optical radiation that has been in interaction with the web 10 and that originates from the optical source 200. The interaction may mean that optical radiation passes through the web 10, whereby the intensity of optic radiation attenuates wavelength selectively depending on cellulose and water content of the web 10.

The detector 202 may comprise one or more detecting elements. The detector 202 may comprise detecting elements in line or matrix formation.

In an embodiment, the detector 202 may comprise a part that spreads different wavelengths of the broadband optical radiation into spectrum such that at least two detecting components detect different wavelength bands. The part spreading radiation into a spectrum may comprise a prism or a lattice. The spectrum indicates the intensity or attenuation of radiation as a function of the wavelength. Such a detector 202 may comprise a spectrometer, for example.

In order to measure attenuation or absorption, intensity of the infrared radiation at a wavelength dominantly absorbed by water is measured and compared with intensity of the infrared light measured at a wavelength apart from a wavelength dominantly absorbed by water, cellulose and ash. Correspondingly, intensity of the infrared radiation at a wavelength dominantly absorbed by cellulose is measured and compared with intensity of the infrared light measured at a wavelength apart from a wavelength dominantly absorbed by water, cellulose and ash.

In order to calibrate the apparatus, attenuation or absorption of the infrared radiation originating from the optical source 200 and/or 220 may be measured. Then any variation of the optical intensity of the optical source 200 and/or 220 may be detected and compensated.

FIG. 2 illustrates also an example of an optical ash sensor 24 which may comprise an optical radiation source 220 and an ash detector 222. In an embodiment, the optical radiation source 220 is the same as the optical source 200 for water and cellulose measurement. In an embodiment, the ash detector 222 may also be the same as the detector 202 for water and cellulose measurement. The ash detector 222 may detect attenuation or absorption of the optical radiation transmitted from the optical radiation source 220 through the sheet 10 at at least one dominant absorption band of ash. Talc may be measured at about 1390 nm, clay may be measured at about 2208 nm and calcium carbonate may be measured at about 3980 nm, for example.

Figure 3:
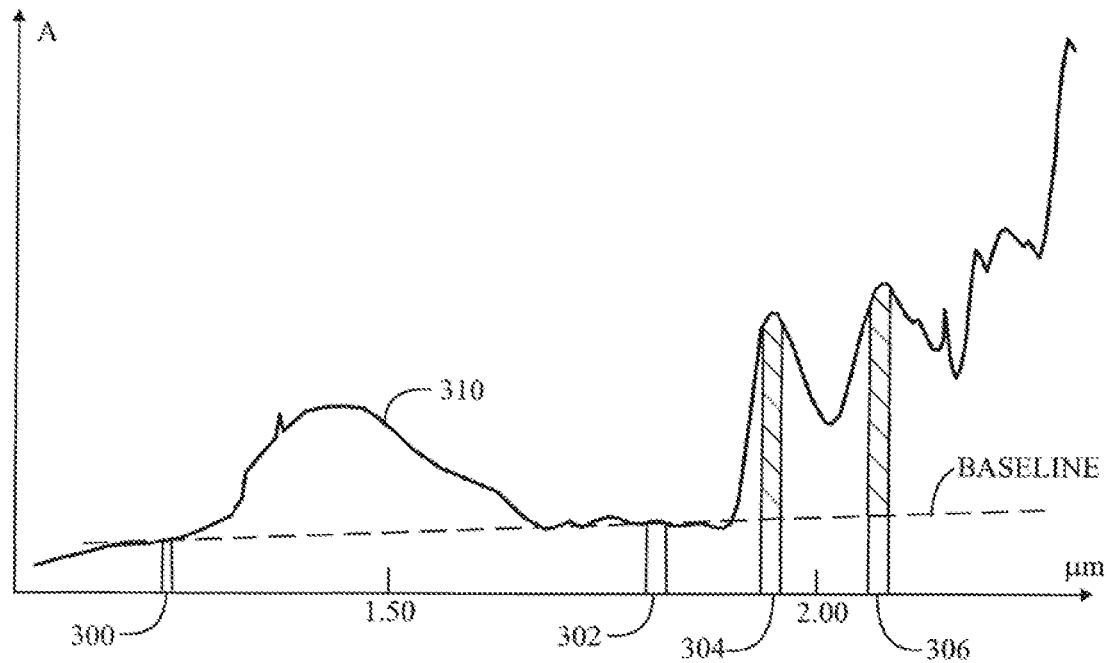
FIG. 3 illustrates an example of attenuation of optical radiation in interaction with a sheet of paper or board.

FIG. 3 illustrates an example of absorption of the web 10 and the optical measurement bands 300, 302, 304, 306. The y-axis is attenuation or absorbance in an arbitrary scale. The x-axis is wavelength in micro meters. Water has a dominant absorption band 304 at about 1.95 μm (wavenumber about 5130 cm$^{-1}$) and thus moisture percentage or water mass per unit are of the web 10 may be measured at the band 304. Cellulose has a dominant absorption band 306 at about 2.11 μm (wavenumber about 4740 cm$^{-1}$) and thus cellulose mass per unit are of the web 10 may be at the band 306. Dominant absorption of the optical radiation takes place at a wavelength where a local maximum of absorption is. Peaks (304, 306) of absorption are local maximums soaring above their environment.

Reference measurements to determine the relative water absorption and the relative cellulose absorption should be measured at wavelength bands where neither water nor cellulose has dominant absorption. Such non-dominant absorption wavelength bands 300 and 302 may be at about 1.8 μm (wavenumber about 5555 cm$^{-1}$) and about 1.3 μm (wavenumber about 7692 cm$^{-1}$), for example, without limiting to these. A baseline, which the person skilled in the art is, per se, familiar with, may also be determined with the reference measurements. The baseline defines a general tilt of the attenuation as a function of the wavelength. The hatched area above the baseline at the dominant wavelengths represent strength of attenuation or absorption.

The X-ray source 210 outputs X-rays that have energy between about 1 keV and about 10 keV. Photons of this energy range may also be considered to belong to gamma radiation. However, a fairly general concept is that photons of the gamma radiation have energies 100 keV or more and that is why the source 210 is called an X-ray source in this document. Low energy X-rays of the range about 1 keV to about 10 keV is often referred to as soft X-rays and considered less harmful than beta-radiation, for example.

In an embodiment, the X-ray source 210 may comprise an X-ray tube, which is a well-known generator of X-rays. The X-ray tube is harmless when it does not have operational voltage switched on. There is no half-life of an isotope, and the X-ray tube is stable.

In an embodiment, the X-ray source 210 may comprise a radioactive isotope iron-55 ($^{55}$Fe), for example. The emitted X-rays from the iron-55 material of the X-ray source 210 are almost monochromatic, and a constant intensity of the X-rays continues for years. The energy of photons of the X-rays from the iron-55 is about 6 keV.

In an embodiment, the X-ray source 210 may comprise an X-ray fluorescence (XRF) source, which emits fluorescent X-rays as secondary radiation caused by exciting source material with higher energy X-rays. These are only examples of the X-ray source 210. X-ray sources are well-known, per se, and a person skilled in the art is familiar with X-ray sources, per se.

In an embodiment, the X-rays detector 212 may be a dosimeter, for example. In an embodiment, the X-rays detector 212 may comprise a semiconductor detector, for example. The X-ray detector 212 may comprise PIN diode (standard Si PIN diode, for example), silicon lithium (Si(Li)) detector, Ge(Li), Silicon Drift Detector SDD. X-ray detectors are well-known, per se, and a person skilled in the art is familiar with X-ray detectors, per se.

The Si(Li) detector may detect X-rays in a range about 1.5 keV to about 10 keV. The Ge(Li) detector may detect X-rays at or below 10 keV. The lithium drifted silicon detector may be used for X-rays in a range about 4 keV to about 10 keV, for example.

Based on what is explained above, a measurement apparatus comprises the optical sensor 20, which performs repeatedly transmission measurements through the moving sheet 10 of paper or board at at least one wavelength band dominantly absorbed by water, and at at least one wavelength band dominantly absorbed by cellulose. The apparatus also comprises the X-ray sensor 22, which performs repeatedly transmission measurements through the moving sheet 10 of paper or board with photons of electromagnetic radiation in a range 1 keV to 10 keV.

The apparatus further comprises the data processing unit 128, which receives signals with information on intensities of the optical and X-ray radiations passed through the sheet 10 from the optical sensor 20 and the X-ray sensor 22. The data processing unit 128 then determines, based on the information, all of the following of the sheet 10, the sheet moving in the machine direction: ash content, basis weight and dry stuff content. The information on the intensities may include attenuation or absorption information caused by the sheet 10 to the optical and X-ray radiation intensities, and/or percentages of the optical and X-ray radiation energies passed through the sheet 10.

A basis weight BW of the sheet 10 is a combination of the weight of water WW and the dry stuff content OD, i.e. BW=WW+OD. The dry stuff content may also be called an oven dry weight. The basis weight is an areal density of the sheet 10, which refers to its mass per unit of area. The basis weight, in turn, can also be called grammage.

The data processing unit 128 can determine ash mass per unit area of the sheet 10 based on the transmission measurements with the photons of electromagnetic radiation in a range 1 keV to 10 keV. Then the data processing unit 128 may determine cellulose mass per unit area of the sheet 10 based on the optical transmission measurements at the at least one wavelength band 306 dominantly absorbed by cellulose. The data processing unit 128 can then determine the dry stuff content as a function of the cellulose mass per unit area of the sheet 10, the water weight per unit area and the ash mass per unit area of the sheet 10. The mass of ash per unit area may be formed based on the ash percentage or relative ash content that is measured with the X-ray measurement.

In an embodiment, the data processing unit 128 may control feed of at least one of partial stock, feed of filler, feed of retention agent and removal of sand based on the ash mass per unit area of the sheet 10.

In an embodiment, the data processing unit 128 may determine water mass per unit area of the sheet 10 based on the transmission measurements at the at least one wavelength band 304 dominantly absorbed by water, and determine the basis weight as a function of the dry stuff content and the water mass per unit area.

Figure 4A:
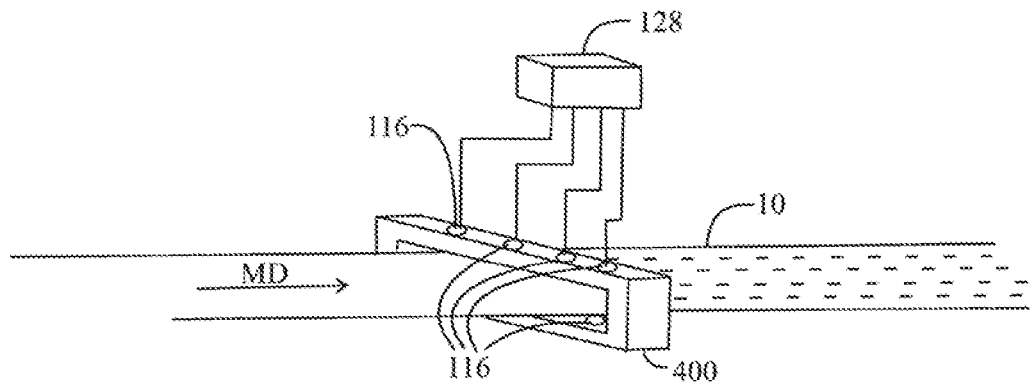
FIG. 4A illustrates an example of cross machine direction measurement of a sheet.

In an embodiment an example of which is illustrated in FIG. 4A, the data processing unit 128 may determine the basis weight and/or the dry stuff content as an average of a plurality of measurements in the machine direction MD. Pieces of the dashed lines illustrate the plurality of points at which detections of attenuation or absorption have been performed.

Figure 4B:
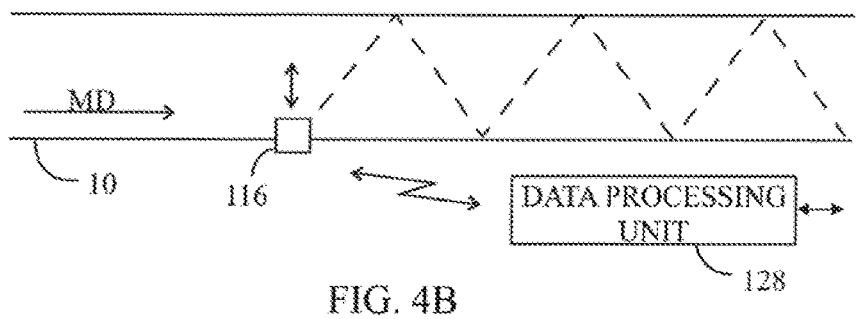
FIG. 4B illustrates an example of traversing measurement device.

In an embodiment an example of which is illustrated in FIG. 48, the measurement apparatus comprises the at least one pair of sensors 116, which may comprise the optical sensor 20 and the X-ray sensor 22 and which may traverse over the moving sheet 10 in a cross direction that is perpendicular to the machine direction. The traverse is illustrated in FIG. 4B with a zig-zag dashed line because when the sheet 10 moves in the machine direction and the at least one pair of sensors 116 travels in a perpendicular direction the line of measurement becomes zig-zag over the sheet 10. The communication between the at least one pair of sensors 116 and the data processing unit 128 may be wired or wireless which is also shown in FIGS. 4A and 4B.

In an embodiment, the apparatus may comprise the optical ash sensor 24, which may perform repeatedly transmission measurements through the moving sheet 10 of paper or board with optical radiation at at least one wavelength band dominantly absorbed by at least one substance of the ash. The data processing unit 128 may then receive a signal with information on absorption of ash from the optical ash sensor 24, and determine the basis weight and/or the dry stuff content based also on the information from the optical ash sensor 24. The optical ash sensor 24 may be used to provide additional information on mass of ash per unit area of the sheet 10. If mass of ash per unit area measured with the X-ray sensor 22 and mass of ash per unit area measured with the optical ash sensor 24 deviate more than a predetermined threshold, operation of the sensors 22, 24 may be checked. The predetermined threshold may adjustable and its value may depend on quality and/or grade of the sheet 10, power of the optic source 200, 220, sensitivity of the detector 202, 222, any combination of these or the like, for example.

In an embodiment, the optical ash sensor 24 may perform repeatedly transmission measurements through a moving sheet 10 of paper or board at at least one wavelength band dominantly absorbed by at least one substance of the ash. Each of the components of ash may have their own specified dominant absorption wavelength band. The component of ash may be a substance of the filler TA and/or a retention agent RA. However, pulp of wood includes also naturally components of ash. The data processing unit 128 may then receive a signal with information on absorption of ash from the optical ash sensor 24, and determine the basis weight and/or the dry stuff content based additionally on the information on ash from the optical ash sensor 24.

In an embodiment, the optical sensor 20 may perform at least one reference transmission measurement through the sheet 10 at at least one wavelength band apart from the at least one wavelength band dominantly absorbed by water, ash and cellulose. The data processing unit 128 may then determine the basis weight and/or the dry stuff content based on strengths of absorptions of the at least one reference transmission measurement and the transmission measurements of water and cellulose. As can be seen in FIG. 3, absorption may be as a difference between a level (dashed line) of the reference measurements 300, 302 and the value at a peak of the absorption at wavelengths 304, 306 of dominant absorption of water and cellulose.

Figure 5:
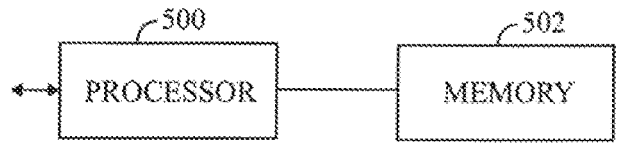
FIG. 5 illustrates an example of a data processing unit.

FIG. 5 illustrates an example the data processing unit 128, which may comprise one or more processors 500 and one or more memories 502 including computer program code. The one or more memories 502 and the computer program code may, with the one or more processors 500, cause the measurement apparatus to receive the signals with the information on water, cellulose and ash content of the sheet 10 from the optical sensor 20 and the X-ray sensor 22, and determine the at least one oldie following of the moving sheet 10, the sheet 10 moving in the machine direction: the dry stuff content as a function of the cellulose mass per unit area of the sheet 10, water mass per unit area of the sheet 10 and the ash mass per unit area of the sheet 10.

The distances between the sources 200, 210, 220 and detectors 202, 212, 222 may kept constant or their distances may be measured and any effect on the optical and X-ray measurements of distance variance may be compensated.

Correspondingly, the distances between the sources 200, 210, 220 and the sheet and/or the detectors 202, 212, 222 and the sheet 10 may kept constant or their distances may be measured and any effect on the optical and X-ray measurements of distance variance may be compensated.

In an embodiment, the data processing unit 128 may control a slice opening 108 of the headbox 106 in a cross direction. In this manner, amount of the stock on former 110 may be controlled in the cross direction. The amount of the stock, in turn, has effect on the water weight, the basis weight and/or the ash content of the sheet 10. In this manner, the water weight, the basis weight, the cellulose content and/or the ash content of the sheet 10 may be controlled, and the basis weight, the cellulose content and/or the ash content of the final product i.e. paper or board may be controlled.

Figure 6:
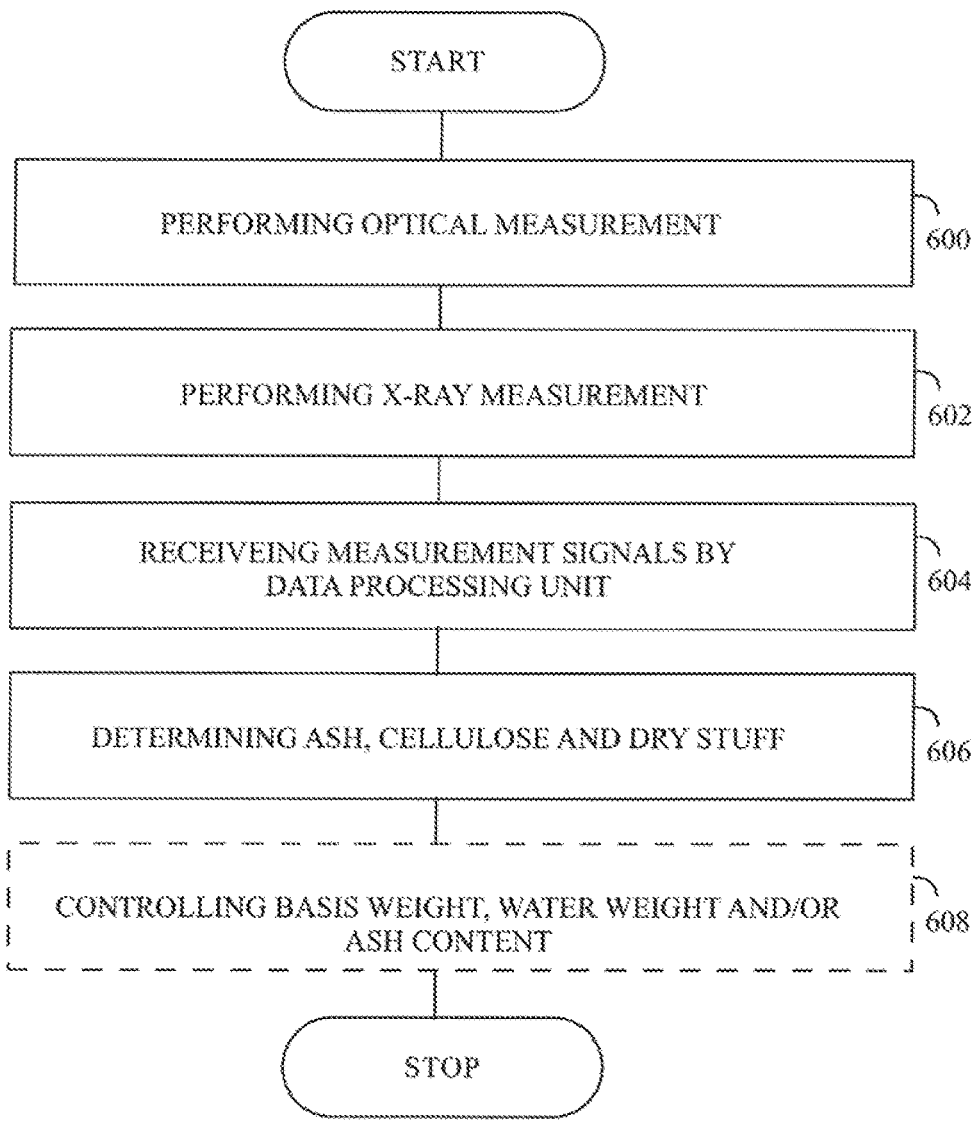
FIG. 6 illustrates of an example of a flow chart of a measuring and control method.

FIG. 6 illustrates an example of a flow chart of the measurement and control method. In step 600, transmission measurements are repeatedly performed, by an optical sensor 20, through a moving sheet 10 of paper or board at at least one wavelength band dominantly absorbed by water, and at at least one wavelength band dominantly absorbed by cellulose. In step 602, transmission measurements are repeatedly performed, by an X-ray sensor 22, through the moving sheet 10 of paper or board with photons of electromagnetic radiation in a range 1 keV to 10 keV. In step 604, signals with information on water, cellulose and ash absorptions of the sheet 10 are received from the optical sensor 20 and the X-ray sensor 22 by a data processing unit 128. In step 606, at least one of the following of the moving sheet 10 is determined, by the data processing unit 128, in machine direction: ash content, cellulose content and dry stuff content based on the information.

In step 608 that is a control step, basis weight, water weight and/or ash content can be controlled.

In an embodiment, feed of at least one of partial stock, feed of filler, feed of retention agent and removal of sand is controlled, by the data processing unit 128, based on the basis weight or the dry stuff content.

The method shown in FIG. 6 may be implemented as a logic circuit solution or computer program. The computer program may be placed on a computer program distribution means for the distribution thereof. The computer program distribution means is readable by a data processing device, and it encodes the computer program commands, carries out the measurements and optionally controls the processes on the basis of the measurements.

The computer program may be distributed using a distribution medium which may be any medium readable by the controller. The medium may be a program storage medium, a memory, a software distribution package, or a compressed software package. In some cases, the distribution may be performed using at least one of the following: a near field communication signal, a short distance signal, and a telecommunications signal.

It will be obvious to a person skilled in the art that, as technology advances, the inventive concept can be implemented in various ways. The invention and its embodiments are not limited to the example embodiments described above but may vary within the scope of the claims.

The invention claimed is:

1. A measurement apparatus, wherein the measurement apparatus comprises:
    an optical sensor, which is configured to perform repeatedly transmission measurements through a moving sheet of paper or board at at least one wavelength band dominantly absorbed by water, and at at least one wavelength band dominantly absorbed by cellulose;

an X-ray sensor, which is configured to perform repeatedly transmission measurements through the moving sheet of paper or board with photons of electromagnetic radiation in a range 1 keV to 10 keV; and a data processing unit, which is configured to receive signals with information on intensities of the optical and X-ray radiations passed through the sheet from the optical sensor and the X-ray sensor, and determine, based on said information all of the following of the sheet (10), the sheet (10) moving in a machine direction, ash mass per unit area of the sheet based on the transmission measurements with the photons of electromagnetic radiation in a range 1 keV to 10 keV, cellulose mass per unit area of the sheet based on the transmission measurements at the at least one wavelength band dominantly absorbed by cellulose, and determine the dry stuff content as a function of the cellulose mass per unit area of the sheet, water mass per unit area of the sheet and the ash mass per unit area of the sheet.

2. The apparatus of claim 1, wherein the data processing unit is configured to
determine water mass per unit area of the sheet based on the transmission measurements at the at least one wavelength band dominantly absorbed by water; and
determine the basis weight based as a function of the dry stuff content and the water mass per unit area.

3. The apparatus of claim 1, wherein the data processing unit is configured to determine the basis weight and/or the dry stuff content as an average of a plurality of measurements in the machine direction.

4. The apparatus of claim 1, wherein the measurement apparatus comprises at least one pair of sensors, which comprises the optical sensor and the X-ray sensor and which is configured to traverse over the moving sheet in a cross direction that is perpendicular to the machine direction.

5. The apparatus of claim 1, wherein
the optical sensor is configured to perform at least one reference transmission measurement through the sheet at least one wavelength band apart from the at least one wavelength band dominantly absorbed by water, ash and cellulose; and
the data processing unit is configured to determine the basis weight and/or the dry stuff content based on strengths of absorptions of the at least one reference transmission measurement and the transmission measurements of water and cellulose.

6. The apparatus of claim 1, wherein that the apparatus comprises
one or more processors; and
one or more memories including computer program code;
the one or more memories and the computer program code configured to, with the one or more processors, cause apparatus at least to:
receive the signals with the information on water, cellulose and ash content of the sheet from the optical sensor and the X-ray sensor, and
determine, based on said information all of the following of the moving sheet in machine direction, the ash mass per unit area of the sheet, the cellulose mass per unit area, and the dry stuff content.

7. A measurement method, comprising
preforming, by an optical sensor, transmission measurements repeatedly through a moving sheet of paper or board at at least one wavelength band dominantly absorbed by water, and at at least one wavelength band dominantly absorbed by cellulose;
preforming, by an X-ray sensor, transmission measurements repeatedly through the moving sheet of paper or board with photons of electromagnetic radiation in a range 1 keV to 10 keV;
receiving, by a data processing unit, signals with information on water, cellulose and ash absorptions of the sheet from the optical sensor and the X-ray sensor; and
determining, by the data processing unit based on the information, all of the following of the sheet, the sheet moving in a machine direction:
ash mass per unit area of the sheet based on the transmission measurements with the photons of electromagnetic radiation in a range 1 keV to 10 keV,
cellulose mass per unit area of the sheet based on the transmission measurements at the at least one wavelength band dominantly absorbed by cellulose; and
determining the dry stuff content as a function of the cellulose mass per unit area of the sheet, water mass per unit area of the sheet and the ash mass per unit area of the sheet.

8. The measurement method of claim 7, further comprising
determining water mass per unit area of the sheet based on the transmission measurements at the at least one wavelength band dominantly absorbed by water; and
determining the basis weight as a function of the dry stuff content and the water mass per unit area.

* * * * *